(No Model.)

G. W. LARAWAY.
MACHINERY FOR MOLDING BARREL HEADS.

No. 308,616. Patented Dec. 2, 1884.

Witnesses.
S. N. Piper
E. B. Pratt

Inventor.
Geo. Washington Laraway.
by R. H. Eddy atty.

United States Patent Office.

GEORGE WASHINGTON LARAWAY, OF HARTFORD, CONNECTICUT, ASSIGNOR, BY MESNE ASSIGNMENTS, TO HIMSELF, AND JOHN F. SEIBERLING, OF AKRON, OHIO.

MACHINERY FOR MOLDING BARREL-HEADS.

SPECIFICATION forming part of Letters Patent No. 308,616, dated December 2, 1884.

Application filed January 28, 1884. Renewed November 3, 1884. (No model.)

*To all whom it may concern:*

Be it known that I, GEORGE WASHINGTON LARAWAY, of the city and county of Hartford, in the State of Connecticut, have invented a new and useful Improvement in Machinery for Molding Barrel-Heads or Devices of Like Character from Paper-Pulp; and I do hereby declare the same to be described in the following specification and represented in the accompanying drawings, of which—

Figure 1:
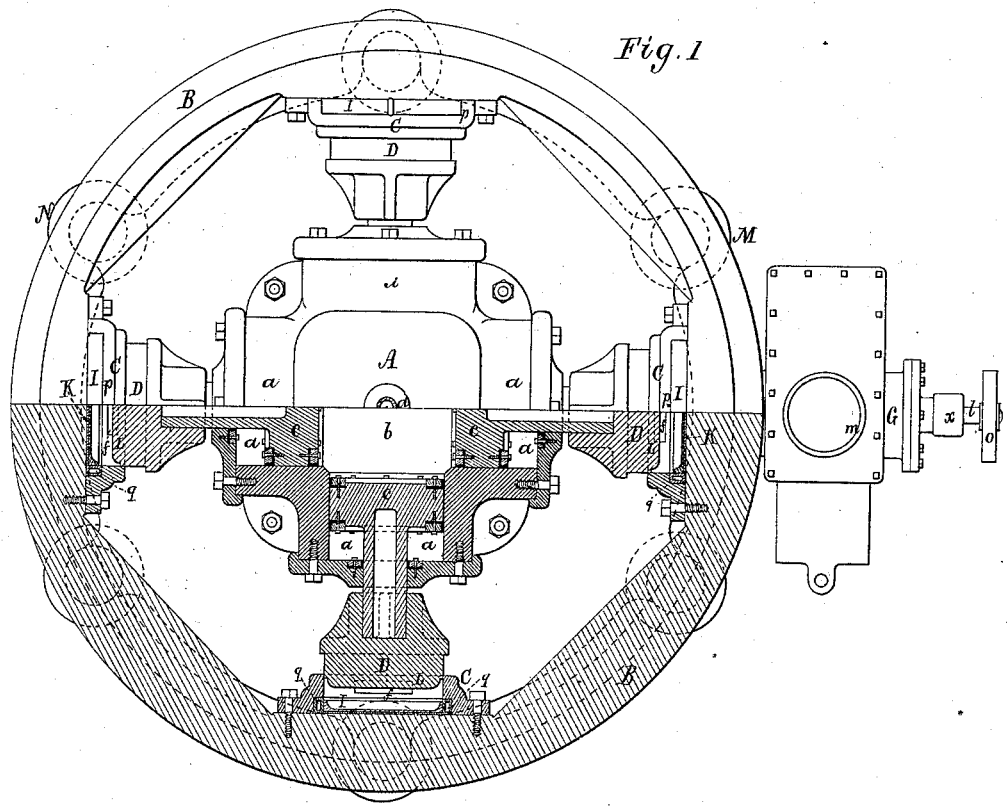
Figure 2:
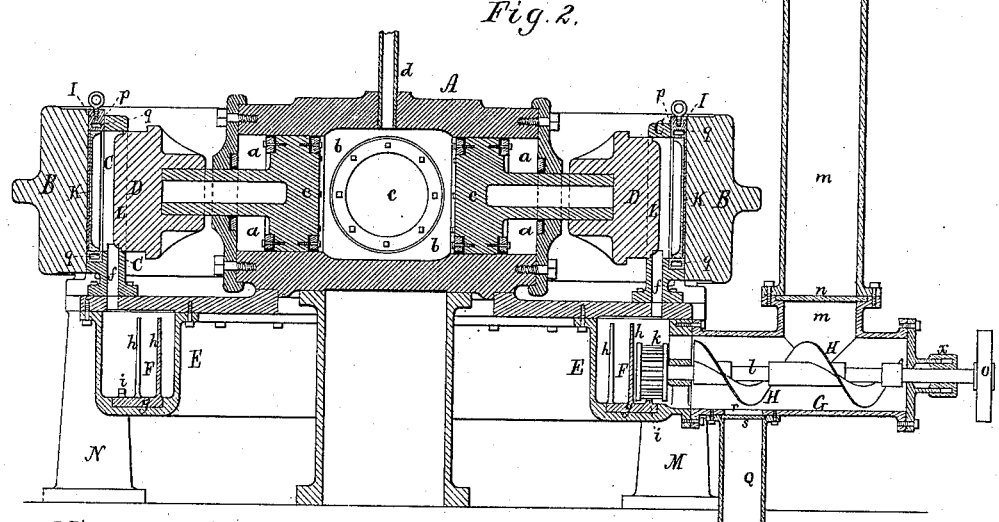

Figure 1 is a top view, (in which certain parts to be described are represented in horizontal section,) and Fig. 2 a vertical and transverse and median section, of a machine embodying my invention, the nature of which is defined in the claims hereinafter presented.

In such drawings, A denotes a hydraulic press provided with a series of four cylinders, $a$, leading radially out of a common central chamber, $b$, and each having a piston, $c$. Water, on being forced into the chamber through an induct, $d$, by a force-pump, will, on the chamber being filled, cause the several pistons to move simultaneously and rectilinearly in their cylinders. Surrounding the hydraulic press so made is a strong ring, B, for sustaining the several molding-cylinders C, whose pistons or plungers D are affixed to the rods of the pistons $c$. Each molding-cylinder C opens by a port or conduit, $f$, into a closed annular vat, E, arranged beneath the hydraulic press and the said molding-cylinders. Within the vat is a rotary annular agitator, F, composed of a ring, $g$, and a series of arms, $h$, extending upward from it, the said ring being provided with a circular range of teeth, $i$, to engage with a lantern-pinion, $k$, fixed on a shaft, $l$. The said shaft $l$ goes lengthwise through a cylinder, G, provided at its closed end with a stuffing-box, $x$, to receive such shaft, such cylinder opening at its inner end into the annular vat. The shaft $l$ has a screw-propeller, H, on it, as shown. A pipe, $m$, provided with a gate, $n$, extends upward from and opens into the cylinder G, and serves to convey the paper-pulp from a reservoir of such into the cylinder.

On the outer end of the shaft $l$ is a driving-wheel or pulley, $o$, which, on being revolved by a belt from a suitable motor, will cause the shaft $l$ and its screw-propeller and lantern-pinion to be revolved. Each molding-cylinder C has a mouth, $p$, leading vertically out of it, to enable a mold-carrying drawer, I, to be inserted in and removed from the cylinder as occasion may require. Within the said drawer is the barrel-head female die K, the drawer around and concentric with the mold being chambered, as shown at $q$, to receive steam or heated air for heating it for drying the barrel-head. Each plunger D carries a male die, L, for forming, with the next adjacent female die, K, a barrel-head.

M and N are standards or posts for supporting the vat and hydraulic press.

In the bottom of the cylinder G is an opening, $r$, provided with a gate, $s$, such opening leading into an educt, Q, for discharging the pulp, as occasion may require, into a cistern situated below the floor on which the machine may rest.

The operation of the machine may be thus explained: In the first place, all the pistons of the hydraulic press having been driven back by water forced into each of the cylinders of such pistons, or by any other suitable means, the gate $n$ is to be opened, so as to allow the pulp to pass into the cylinder G. The screw-propeller, being in revolution, will force the pulp into the vat, which, becoming filled, the pulp will be driven from it through the ducts $f$ upward into the mold-cylinders and between the molding dies of each of such cylinders. On the molding-cylinders becoming sufficiently charged with the pulp, the gate $n$ is to be closed and the hydraulic press set in operation, so as to advance simultaneously all the pistons, and thereby cause the pulp in the molding-cylinders to be compressed between and by the molding-dies. Next, the gate $s$ is to be opened, so as to draw off the pulp sufficiently to enable the mold-pistons to be retracted without pulp flowing into the molding-cylinders during such retraction.

For discharge of water from the molds, the dies thereof are usually perforated or provided with suitable ducts.

After the barrel-heads may have been molded, as explained, the female die-drawers are to be removed from the machine and subjected to heat or other means for drying the barrel-heads in them.

The agitator is to keep the pulp in the vat properly stirred, in order to prevent settling of the heavier portions thereof.

I do not confine the hydraulic press of my machine to four cylinders and their pistons, as it may have any suitable number thereof, each piston being to operate the piston or plunger of a molding-cylinder provided with dies, as set forth.

I claim—

1. The combination of the pulp-receiving vat and the rotary agitator therein, having mechanism for operating such agitator, as set forth, with the hydraulic press and the series of mold-cylinders and their pistons, provided with or adapted to support dies for molding articles from paper-pulp, each molding piston or plunger being fixed to a piston of the hydraulic press, and all being to operate substantially as represented.

2. The combination of the pulp receiving-vat and the rotary agitator therein, having mechanism for revolving it, with the hydraulic press and the series of mold-cylinders, their pistons, and encompassing and supporting ring, such mold-cylinders and pistons being provided with or adapted to support dies, and all being arranged substantially and to operate as and for the purpose represented.

3. The combination of the rotary propeller and its cylinder, having the induct and educt and their gates, as described, with the annular vat, its rotary agitator, and mechanism for revolving such agitator and propeller, and with the hydraulic press and the series of mold-cylinders and their pistons, provided with or adapted to support dies, all being substantially and for the purpose as represented.

4. The combination of the rotary propeller and its cylinder, having the induct and educt and their gates, as described, with the annular vat, its rotary agitator, and mechanism for revolving such agitator and propeller, and with the hydraulic press and the series of mold-cylinders and their supporting and encompassing ring and their pistons, such cylinders and pistons having or being adapted to support dies, as explained, and such pistons being connected with those of the hydraulic press, so as to be operated thereby, all being substantially and for the purpose as set forth.

5. Each female die-drawer chambered to receive steam or heated air for heating the drawer for the purpose of drying a barrel-head when in the molding-die of such drawer.

GEORGE WASHINGTON LARAWAY.

Witnesses:
R. H. EDDY,
E. B. PRATT.